July 19, 1955  K. L. NIELSEN  2,713,205

THREE-DIMENSIONAL AND SPHERICAL RULER

Filed March 29, 1950

INVENTOR:
KAJ L. NIELSEN
BY
ATT'Y

United States Patent Office 2,713,205
Patented July 19, 1955

2,713,205

THREE-DIMENSIONAL AND SPHERICAL RULER

Kaj L. Nielsen, Indianapolis, Ind.

Application March 29, 1950, Serial No. 152,711

2 Claims. (Cl. 33—104)

(Granted under Title 35, U. S. Code (1952), sec. 266)

This invention relates in general to rulers for making three dimensional and spherical drawings by means of which accurate space drawings may be made rapidly and easily.

Space diagrams have been constructed heretofore chiefly by the use of two triangles, by the use of a simple straight edge, and for spherical diagrams, by the use of ellipses and french curves. By the proper placing of two triangles, coordinate axes and parallel lines may be constructed and space diagrams can be drawn. This requires two instruments and considerable maneuvering of them, and if the triangles are not scaled, a third instrument is needed to aid in locating points or measuring distances.

An important object of the invention is to provide instruments for draftsmen, engineers, students, report writers, and the like, which will enable them to make three dimension space drawings rapidly and easily.

A further object of the invention is to provide an instrument which combines two or more instruments in one with greater ease in use and application and added functions gained by scale marking.

Still a further object of the invention is to provide a drawing instrument in which three coordinate axes can be drawn with one placement thereof and the separate lines thereof constructed to scale.

Another object of the invention is to provide a space drawing instrument in which two parallel lines can be drawn with one placement of the ruler and to project the circles on a sphere unto the plane of the paper.

Other objects of the invention will appear in the specification and will be apparent from the accompanying drawings, in which, Fig. 1 shows a three-dimensional ruler in accordance with this invention for oblique drawings;

These rulers may be made of wood, metal, or other materials, but preferably they are made from thin sheets of transparent plastics and are somewhat flexible. They include lines, slotted grooves, and outer contours which enable students, engineers, and others to rapidly and quickly set up three coordinate axes with but one placement of the ruler, and to make drawings to scale thereon if desired.

Figure 1:
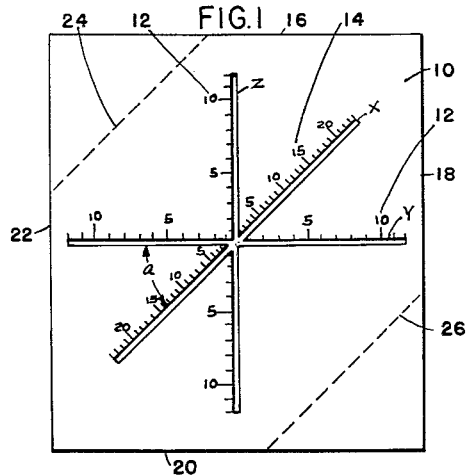

Referring now more particularly to the drawings, a ruler 10 for oblique drawings is shown in Fig. 1 in which there are three axes Y and Z at right angles to each other and X at an angle $a$ usually 30° or 45° (as shown) to the horizontal axis Y. In this ruler the axes are defined by narrow continuous slots with parallel sides sufficiently spaced apart so that parallel lines may be drawn with a pencil or pen close to both sides. Scale markings 12 and 14 may be applied to the edges of the slots and the marking 14 of the X axis may be upon a reduced or different basis compared with those of the other axes, preferably in units of the Y axis times the cosine of the angle $a$.

The outer contour of the ruler may be of any desired shape, but at least two edges 16 and 18 are preferably parallel to the corresponding axes Y and Z and the two edges 20 and 22 may be similarly parallel to the axes and to the opposite sides 16 and 18. Additional lines 24 and 26 may be marked on the ruler parallel to the X axis or inscribed on the surface, or the opposite corners may be cut off on these lines. This construction and arrangement makes it easier to draw lines on the intersecting axes and parallel thereto.

Figure 2:
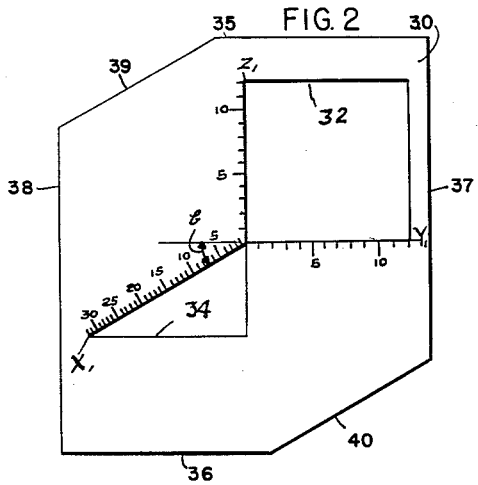
Fig. 2 shows a three-dimensional ruler with oblique axes having rectangular and triangular cut outs.
Figure 3:
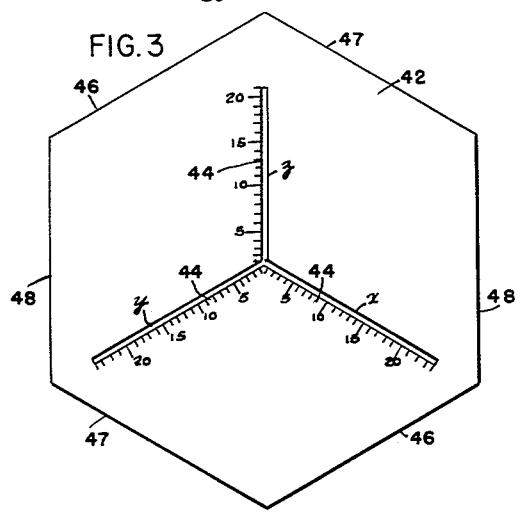
Fig. 3 shows a three-dimensional ruler for isometric drawings.

In the cut out form shown in Fig. 2, a ruler 30 has $X_1$, $Y_1$, and $Z_1$ axes, and the axis $X_1$ appearing in the third quadrant at an angle $b$ to the $Y_1$ axis. Between the $Y_1$ and $Z_1$ axes in the first quadrant is a rectangular cut out 32 in the form of a square, and between the $X_1$ and $Z_1$ axes in the third quadrant is a triangular cut out 34 in the form of a right triangle. Adjacent sides of the square and the triangle are graduated outwardly from their common origin, and opposite sides of the ruler 35, 36 and 37, 38 and 39, 40 are preferably parallel to each other and to the axes $Y_1$, $Z_1$, and $X_1$ respectively. The edges of the openings which may be used to draw the axes preferably intersect at a common point within the ruler.

For isometric drawings a ruler 42 may be provided with slots $x$, $y$, and $z$ radiating from a common origin, at equal angles apart. The slots may be of equal or unequal length and preferably are marked with similar scale graduations 44. Any two opposite edges of the ruler may be parallel to each other and to one axis, but preferably this ruler is hexagonal and has opposite pairs of sides 46, 47, and 48 corresponding with the three axes.

Figure 4:
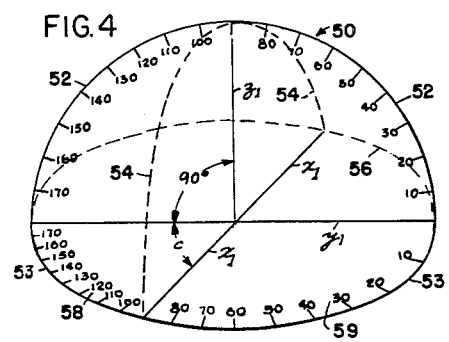
Fig. 4 shows a spherical ruler for oblique axes as in Fig. 1.

A spherical ruler 50 is shown in Fig. 4 having an upper semicircle 52 and a lower semiellipse 53 separated by a diametric hair line $y_1$. At the center is an axis at right angles to the diameter represented by the hair line $z_1$, and at an angle $c$ to the horizontal is an axis hair line $x_1$, passing through the point $o$. An elliptical arc 54 is inscribed upon the axis line $x_1$ terminating at one end upon an inscribed upper elliptical line 56. The variable angle $c$ is usually taken as 30° and the edges of the lower elliptical portion of the ruler are divided into two portions having unequal graduations 58 and 59 corresponding to the third and fourth segments respectively. This ruler may be used in conjunction with a ruler 10 or 30 having an X or $X_1$ axis line of 30° to the horizontal.

The graduations of the ruler 50 are preferably constructed to represent each degree. The semicircular arc is divided in 180 equal parts; the graduations 58 are decreased and the graduations 59 are increased in width depending upon the angle $c$, the entire arc in each case being equally divided into 90 parts.

Figure 5:
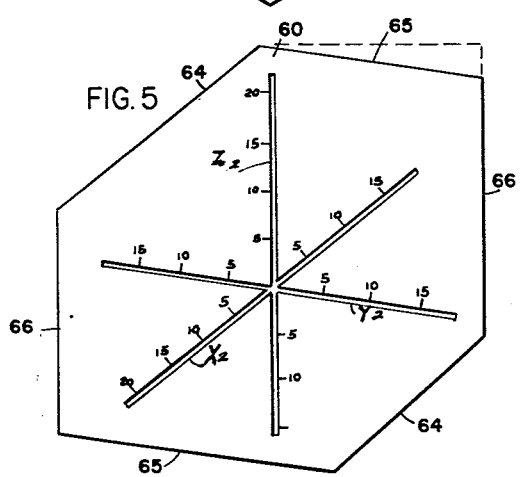
Fig. 5 shows a tri-dimensional ruler for diametric drawings with selected acute angles.
Figure 6:
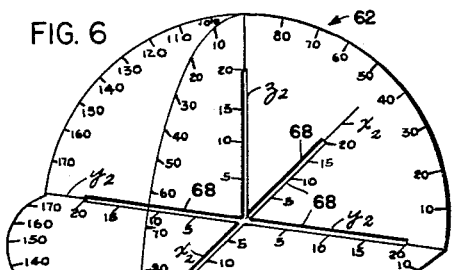
Fig. 6 shows a spherical ruler with angles and axes corresponding to the ruler of Fig. 5.

In a three dimensional ruler 60 shown in Fig. 5 and in a corresponding spherical ruler 62 shown in Fig. 6 axes $X_2$, $Y_2$, and $Z_2$ correspond to axes $x_2$, $y_2$, and $z_2$. In both rulers the relatively horizontal and vertical axes are not exactly at right angles to each other, and the variable axis ($X_2$ or $x_2$) is at an angle of approximately 48° to the horizontal and vertical axes. For sketching purposes this may be better than rigid adherence to an exactly horizontal line and to a variable axis of either 30° or 45°.

It is also an advantage to have the axes of the two rulers, as 60 and 62, at the same relative angles, so that one may be superposed upon the other in the construction, drawing, and measurement of relative arcs, angles, and dimensions. One of the rulers 60 is commonly provided with slots which represent the axes and opposite edges or sides 64, 65, and 66 are preferably parallel with each other and with the respective axes $X_2$, $Y_2$, and $Z_2$. The other ruler 62 may have only hairlines which represent the axes, but if desired these may be replaced or supplemented by slots 68 extending outwardly from the common center, terminating at distances from the edges.

As in the spherical ruler 50, the edges and arcs of the ruler 62 may be graduated in proportionate units and the axes may be graduated in the same units as those on the slot axes of the ruler 50. This will assist in coordinating the lines, angles, arcs, and dimensions, and will enable a draftsman more quickly to construct a figure or drawing to relative proportions. Thus the three dimensions and proper proportions of the drawing may be established with a single placement of the ruler.

These rulers may be used in the proper location of a diagram on a page, to locate coordinates in space, and as specialized protractors. The outer contours of the spherical rulers are so constructed that they form the projections of circles on a sphere into the plane of the paper. By one placement of the ruler these contours may be drawn immediately.

The advantages in the use of these rulers over the methods commonly employed consist mainly in the savings of time, labor, and material, which is due to several instruments incorporated into one.

While the preferred forms of the invention are thus described in some detail they should be regarded as illustrations or examples rather than restrictions or limitations, as many changes in the construction, combination, and arrangement of the parts may be made without departing from the spirit and scope of the invention.

The invention described herein may be manufactured and used by or for the Government of the United States of America for governmental purposes without the payment of any royalties thereon or therefor.

I claim:

1. A three dimensional space ruler for perspective drawings comprising a single thin member having a first opening with two straight intersecting sides delineating first and second intersecting axes, and a second opening having two straight sides intersecting at the intersection of the aforesaid sides of the first opening, one side of the second opening being alined with one side of the first opening and delineating the same axis, the other side of the second opening being out of alinement with the other side of the first opening so as to designate a third axis forming an acute angle between the other two axes, the sides of the openings presenting edges along which lines intersecting medially within the member may be drawn through the member by a pen or pencil.

2. A three dimensional space ruler for perspective drawings comprising a single thin member having a first opening formed as a parallelogram and a second opening formed as a triangle, one side of the triangle and one side of the parallelogram being alined and representing a first axis, another side of the triangle and another side of the parallelogram being nonalined and intersecting one another centrally within the member at the juncture of the said one side of the triangle and parallelogram so as to represent second and third axes, said other side of the triangle if extended falling within the parallelogram at an acute angle to both adjacent sides thereof, the openings presenting edges along which intersecting axes may be drawn through the member by a drawing instrument.

References Cited in the file of this patent

UNITED STATES PATENTS

| 147,942 | Hutchinson | Feb. 24, 1874 |
| 2,393,873 | Thurston | Jan. 29, 1946 |

FOREIGN PATENTS

| 23,344 | Great Britain | Dec. 19, 1892 |
| 604,844 | Great Britain | July 12, 1948 |
| 676,698 | Germany | June 9, 1939 |

OTHER REFERENCES

Publ.: Aero Digest, July 1, 1944 pgs. 80, 81, 132 and 134.